United States Patent
Moriyama et al.

(10) Patent No.: US 7,175,101 B2
(45) Date of Patent: Feb. 13, 2007

(54) THERMOSTAT MOUNTING STRUCTURE

(75) Inventors: Ryuji Moriyama, Saitama (JP); Koji Kobayashi, Saitama (JP); Toyoyuki Yogo, Saitama (JP); Kenji Oki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 343 days.

(21) Appl. No.: 10/796,039

(22) Filed: Mar. 10, 2004

(65) Prior Publication Data

US 2004/0178281 A1 Sep. 16, 2004

(30) Foreign Application Priority Data

Mar. 11, 2003 (JP) .............................. 2003-065549

(51) Int. Cl.
*G05D 23/00* (2006.01)
*F01P 7/14* (2006.01)
*F01P 1/04* (2006.01)

(52) U.S. Cl. ................................ 236/93 R; 236/101 C; 123/41.1; 123/41.39

(58) Field of Classification Search .............. 236/93 R, 236/101 C, 34.5; 123/41.1, 41.08, 41.44, 123/41.3, 41.4, 41.41, 41.05
See application file for complete search history.

(56) References Cited

U.S. PATENT DOCUMENTS 5,292,064 A  3/1994 Saur et al.

6,386,150 B1  5/2002 Iwaki

FOREIGN PATENT DOCUMENTS

| EP | 1067280 A | 1/2001 |
|---|---|---|
| EP | 1067280 A1 * | 1/2001 |
| JP | 2002-39433 A | 2/2002 |

OTHER PUBLICATIONS

Patent Abstracts of Japan, vol. 017, No. 346 (M-1437), Jun. 30, 1993.

* cited by examiner

*Primary Examiner*—Chen Wen Jiang
(74) *Attorney, Agent, or Firm*—Birch, Stewart, Kolasch & Birch, LLP

(57) ABSTRACT

A thermostat mounting structure capable of reliably positioning an embedded thermostat and ensuring high sealability. A coolant channel is formed in a casing. An embedding hole is formed in the casing across the coolant channel. A thermostat includes a cylindrical valve body with a surrounding wall having an entry aperture and an exit aperture. A valving element for advancing and retracting to open and close the entry aperture and the exit aperture. The thermostat is inserted into the embedding hole so that both apertures face the coolant channel. A cover member for covering the embedding hole via a circular rubber seal seated in a groove of the cover member and for fixing the thermostat. A positioning structure for positioning the thermostat to a side of the cover member.

16 Claims, 11 Drawing Sheets

//www.uspto.gov/patents/terms/terms-of-use
THERMOSTAT MOUNTING STRUCTURE

CROSS-REFERENCE TO RELATED APPLICATIONS

The present application claims priority under 35 USC 119 to Japanese Patent Application No. 2003-065549 filed on Mar. 11, 2003 the entire contents thereof is hereby incorporated by reference.

BACKGROUND OF THE INVENTION

1. Field of the Invention

The present invention relates to a mounting structure for a thermostat to control a flow of coolant in a cooling system of an internal combustion engine.

2. Description of Background Art

There is already proposed a mounting structure for an embedded thermostat, e.g., see JP-A No. 39433/2002 (second embodiment). According to this structure, the thermostat is placed in an embedding hole that is formed across a coolant channel of a casing. A cover member covers the embedding hole via a rubber seal and fixes the thermostat.

Referring now to FIG. 17, the mounting structure for the embedded thermostat disclosed in the second embodiment of JP-A No. 39433/2002 provides an embedding hole 03 that is formed across a coolant channel 02 in a casing 01. A thermostat 07 is placed in the embedding hole 03. A cover member 05 covers the embedding hole 03 via a rubber seal 04 and fixes the thermostat 07.

The thermostat 07 has an entry aperture 08a and an exit aperture 08b on a surrounding wall of a cylindrical valve body 08. A valving element 09 advances and retracts to open and close the apertures 08a and 08b. The thermostat 07 is placed in the embedding hole 03 so that both apertures 08a and 08b face to the coolant channel 02 in the casing 01.

A by-pass aperture 08c is provided below the exit aperture 08b to connect an inside space of the valve body 08 with the coolant channel 02. When the valving element 09 advances and retracts due to thermal expansion of wax 010, the exit aperture 08b and the by-pass aperture 08c are selectively opened.

The thermostat 07 is surrounded with an O-ring 011 that partitions an outer peripheral surface of the valve body 08 into a side of the entry aperture 08a and a side of the exit aperture 08b.

The cover member 05 has a by-pass channel 06 and is embedded with the rubber seal 04 in a circular groove. The cover member 05 is attached to the casing 01 via the rubber seal 04 so as to cover the embedding hole of the casing engaged with the thermostat 07.

The rubber seal 04 is pressed to an aperture end of the embedding hole in the casing and over to an aperture end of the cylindrical valve body 08 to fix the thermostat 07.

Accordingly, the O-ring 011 allows the outside space of the valve body 08 of the thermostat 07 to divide the inside of the embedding hole 03 of the casing 01 into halves, i.e., influx and efflux sides. The rubber seal 04 divides the valve body 08 into inside and outside spaces inside the embedding hole 03 of the casing 01.

The above-mentioned conventional structure has an advantage of compactly configuring a thermostat unit. However, the thermostat 07 is supported by the O-ring 011 in a floating manner. No positioning structure is provided to the rubber seal 04 and the casing 01. This causes slight misalignment to the thermostat 07 after assembly.

SUMMARY AND OBJECTS OF THE INVENTION

The present invention has been made in consideration of the foregoing. It is therefore an object of the present invention to provide a simply structured thermostat mounting structure capable of reliably positioning an embedded thermostat and ensuring high sealability.

In order to achieve the above-mentioned object, the present invention provides a thermostat mounting structure, wherein a coolant channel is formed in a casing wherein an embedding hole is formed in the casing across the coolant channel. A thermostat is provided that includes a cylindrical valve body with a surrounding wall that has an entry aperture and an exit aperture wherein a valving element advances and retracts to open and close both apertures. The thermostat is inserted into the embedding hole so that both apertures face the coolant channel. A cover member is provided for covering the embedding hole via a circular rubber seal seated in a groove of the cover member and fixes the thermostat. A positioning structure is provided to position the thermostat to a side of the cover member.

The cover member is attached to the casing by covering the embedding hole. At this time, the positioning structure provided for the cover member positions and fixes the thermostat inserted into the casing's embedding hole. It is possible to reliably prevent misalignment of the thermostat by using a simple structure and ensure high sealability using the rubber seal.

The present invention provides the thermostat mounting structure wherein the positioning structure positions the thermostat by engagedly supporting an aperture end of the cylindrical valve body.

The rubber seal seals the aperture end of the valve body. The aperture end is engagedly supported for thermostat positioning, ensuring more reliable sealing.

The present invention provides the thermostat mounting structure wherein the positioning structure positions the thermostat by inserting a joint into an inside periphery of an aperture end of the cylindrical valve body.

The joint for the cover member is inserted into the inside periphery of the cylindrical valve body's aperture end for thermostat positioning. Reliable positioning is available under no influence of coolant pressure.

The present invention provides the thermostat mounting structure, wherein the joint is a circular rib and wherein the rib is inserted along an inner peripheral surface of an aperture end of the cylindrical valve body to position the thermostat.

The circular rib is inserted along the inner peripheral surface of the valve body's aperture end for positioning. It is possible to configure the positioning structure to be capable of relieving stress.

The present invention provides the thermostat mounting structure wherein the positioning structure is formed on the cover member.

Since the positioning structure is formed on the cover member, no extra positioning member is needed, eliminating the number of parts. The rubber member engagedly supports the rubber seal to eliminate misalignment between the rubber seal's seal portion and the positioned thermostat. Consequently, the sealability further improves.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will be described in further detail with reference to FIGS. 1 through 16.

The thermostat according to the present invention is represented as an embedded thermostat 50 applied to an internal combustion engine's cooling system.

Figure 1:
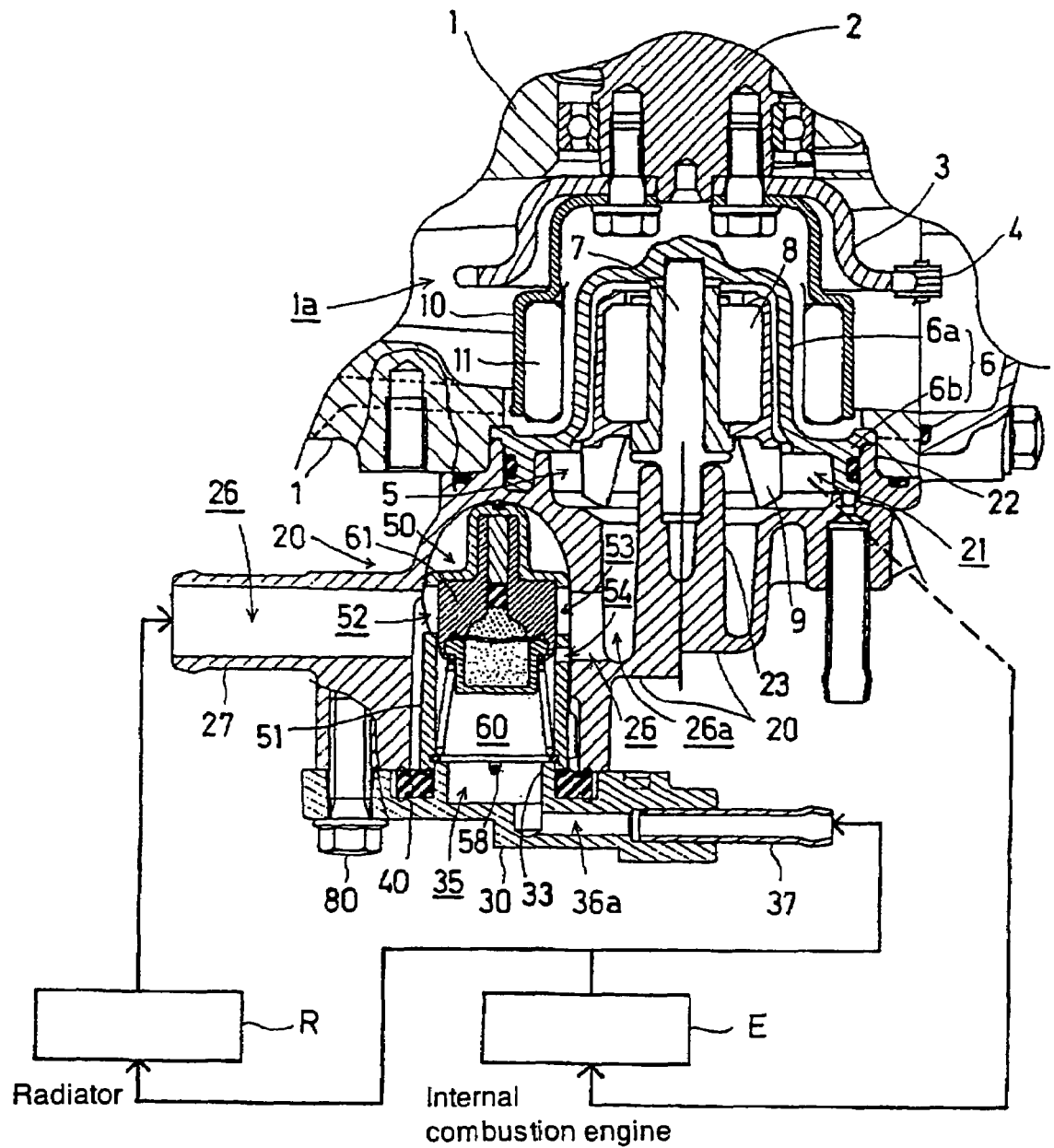
FIG. 1 is a partial sectional view showing a mounting structure of an embedded thermostat according to an embodiment of the present invention applied to a cooling system of an internal combustion engine and showing part of the internal combustion engine.

As shown in FIG. 1, a cam shaft 2 is rotatively supported on a cylinder head 1. A driven sprocket 3 is tightened to an end of the cam shaft 2. A timing chain 4 is looped around the driven sprocket 3. The other end of the timing chain 4 is looped around a driving sprocket fit to a crank shaft (not shown). The timing chain 4 halves the number of revolutions of the crank shaft and transmits the revolution to the cam shaft 2.

The timing chain 4 is provided in a chain chamber 1a formed in the cylinder head 1. A side wall forming the chain chamber 1a is provided with an aperture coaxial with the cam shaft 2. A pump body case 6 is inserted into the aperture. A water pump 5 is placed in the pump body case 6.

The pump body case 6 for the water pump 5 comprises a bottomed cylinder section 6a and a large aperture section 6b. The bottomed cylinder section 6a contains a driven magnet 8 supported by a rotating shaft 7. The large aperture section 6b contains an impeller 9 fit to the rotating shaft 7. A pump cover case 20 covers the large aperture section 6b and axially supports one end of the rotating shaft 7 to rotatively support the driven magnet 8 and the impeller 9.

A driving magnet 11 is provided around the pump body case 6 inserted into the chain chamber 1a of the cylinder head 1. The driving magnet 11 is fit to an inner peripheral surface of the cylindrical support member 10 tightened with the driven sprocket 3 at the end of the cam shaft 2. The driving magnet 11 rotates with the cam shaft 2 to subsequently rotate the driven magnet 8 of the water pump 5 separated by the pump body case 6 and to rotate the impeller 9.

The pump cover case 20 is fit into the large aperture section 6b of the pump body case 6 and has a protruding annular rib 22 constituting a scroll chamber 21 in which the impeller 9 rotates. A bearing section 23 of the rotating shaft 7 protrudes at the center of the pump cover case 20 (see FIGS. 1 and 3).

Figure 2:
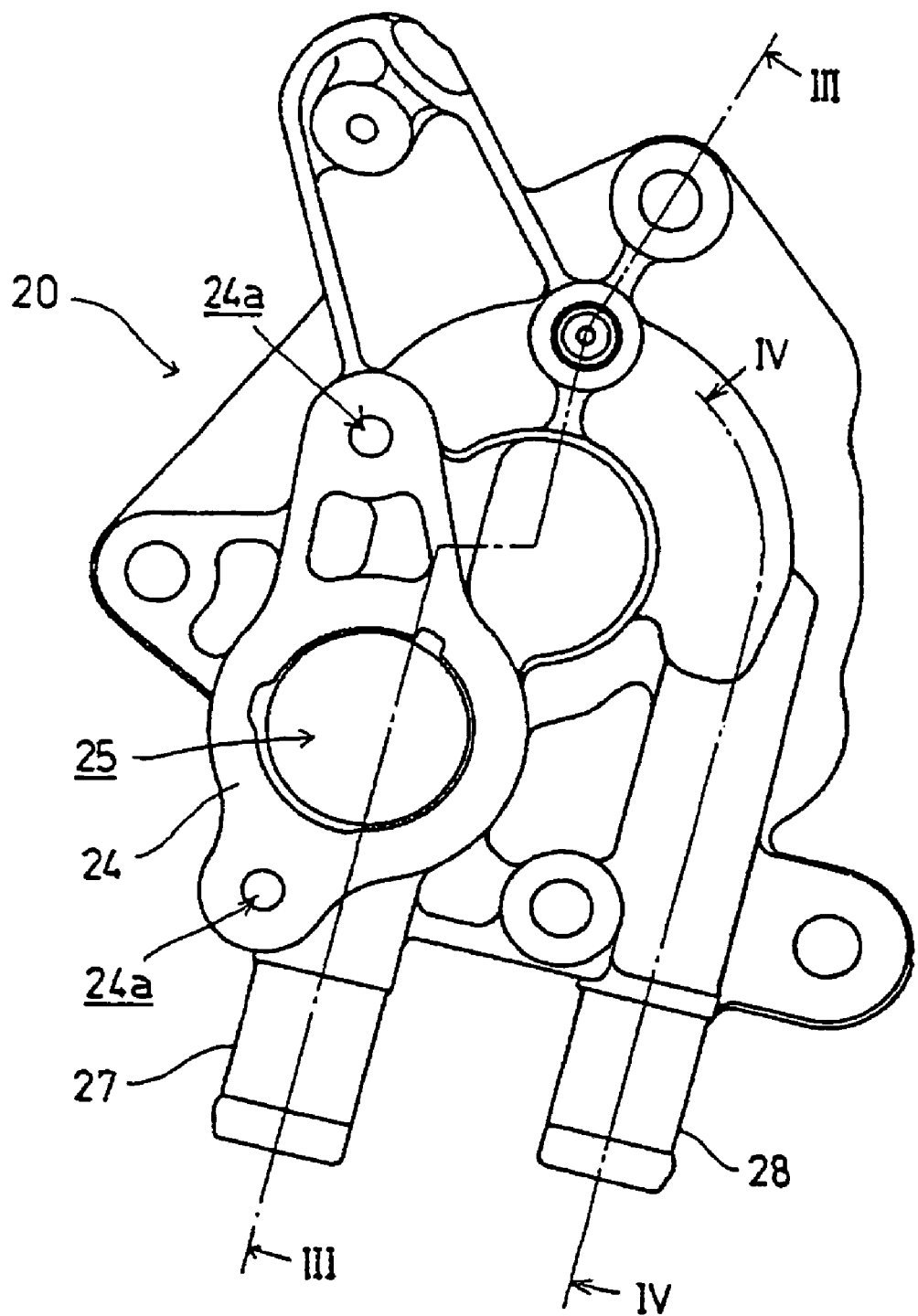
FIG. 2 is a side view of a pump cover case.
Figure 3:
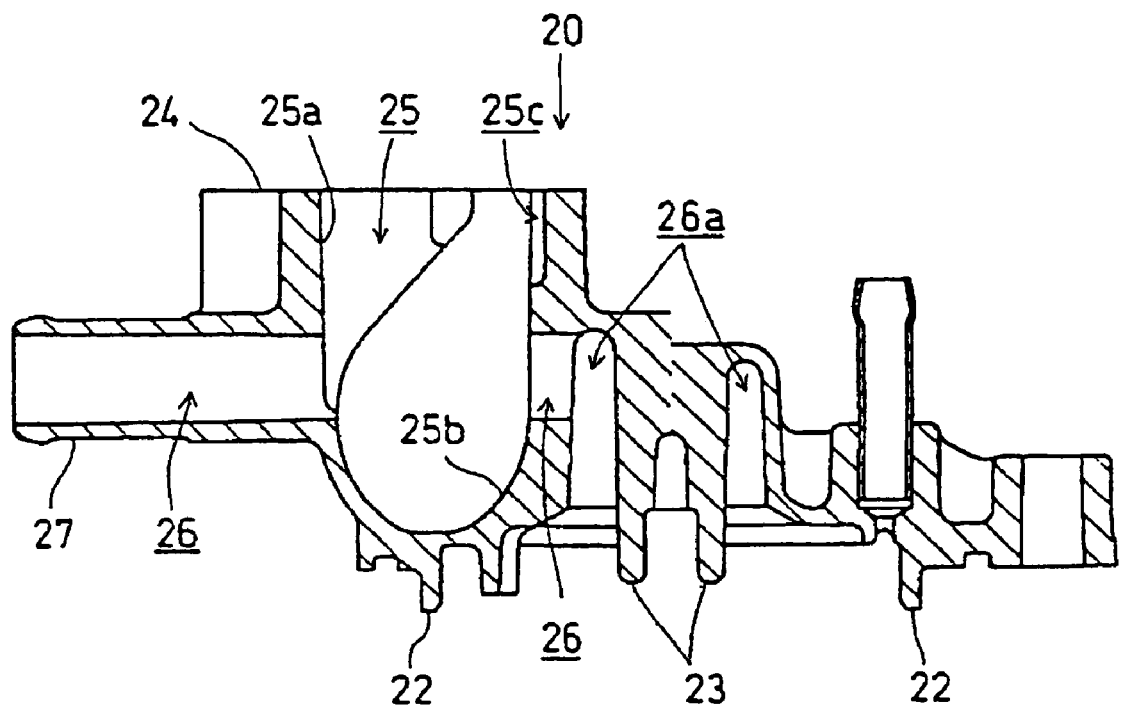
FIG. 3 is a sectional view taken along lines III—III of FIG. 2.
Figure 4:
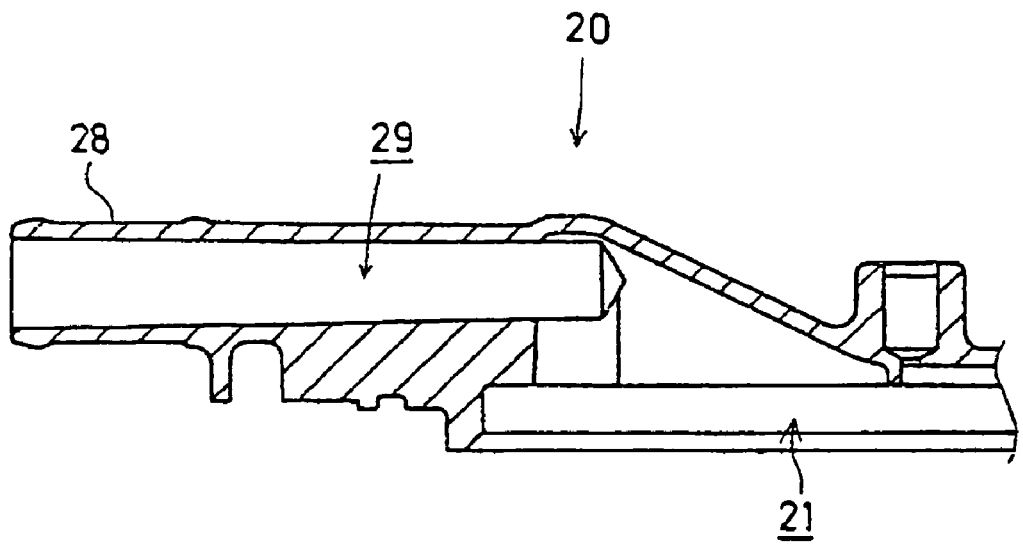
FIG. 4 is a sectional view taken along lines IV—IV of FIG. 2.

As shown in FIGS. 2 through 4, the pump cover case 20 is also used as a thermostat case and has a mating face 24 with the thermostat cover 30 at the opposite side of the scroll chamber 21. A thermostat chamber 25 is largely bored into the mating face 24 so as to be used as an embedding hole for the thermostat 50. The thermostat 50 is inserted into the thermostat chamber 25.

The mating face 24 with the thermostat cover 30 has screw holes 24a disposed in approximately opposite directions on each side of the thermostat chamber 25.

The thermostat chamber 25 forms a slightly tapered inner peripheral surface 25a having a gradually decreasing inside diameter from the mating face 24. The innermost part forms an approximate hemispheric surface 25b.

A slot 25c is partly formed on the tapered inner peripheral surface 25a from the aperture end to the innermost.

A coolant suction channel 26 opens against the inner tapered surface of the thermostat chamber 25 and is formed orthogonally to the thermostat chamber 25. An upstream side portion of the coolant suction channel 26 protrudes as a suction connection pipe 27. The other downstream portion leads to an annular suction channel 26a formed along an outside periphery of the bearing section 23. The thermostat chamber 25 is formed across the coolant suction channel 26.

An exhaust connection pipe 28 protrudes parallel to the suction connection pipe 27 and forms a coolant exhaust channel 29 as shown in FIG. 4. The coolant exhaust channel 29 leads to the scroll chamber 21 formed externally around the impeller 9.

The thermostat 50 is inserted into the thermostat chamber 25 of the pump cover case 20 and is structured as shown in FIGS. 10 through 14. An entry aperture 52 and an exit aperture 53 are formed on a surrounding wall of the slightly tapered cylindrical valve body 51. These apertures are rectangular and are opposite to each other. Further, a by-pass aperture 54 is formed below the exit aperture 53.

One end of the valve body 51 forms an annular aperture end 51a. The other end forms a bottom wall 51b. A bottomed cylinder section 55 having a small diameter protrudes from the center of the bottom wall 51b.

Ribs 56 extend from the bottomed cylinder section 55 to both sides leading to the bottom wall 51b. Each end of the ribs 56 is curved to smoothly make the same surface as the external surface of the valve body 51, forming the same curved surface as the hemispheric surface 25b at the innermost end of the thermostat chamber 25.

The bottomed cylinder section 55 and the ribs 56 are formed integrally with the valve body 51. The ribs 56 are formed along a flat surface including the center axis of the valve body 51 at the middle between the entry aperture 52 and the exit aperture 53 of the valve body 51.

The slot 57 is formed continuously along a line of intersection between a flat surface corresponding to the ridge line center of the ribs 56 including the center axis of the valve body 51 and the end of the ribs 56, the end of the bottomed cylinder section 55, the outer peripheral surface of the valve body 51, and the aperture end 51a of the valve body 51. A rubber O-ring 58 is fit into the slot 57.

The O-ring 58 rises from the slot 57 to divide in two the outside periphery of the valve body 51 into the side of the entry aperture 52 and the side of the exit aperture 53.

A protruded piece 59 is formed near the aperture end 51a below the by-pass aperture 54 on the outer peripheral surface of the valve body 51.

A valving element 61 is slidably inserted into a columnar inside space 60 of the valve body 51. A small-diameter cylinder section 61a extends from the valving element 61 and is slidably inserted into the bottomed cylinder section 55.

A hollowed surface is formed opposite the small-diameter cylinder section 61a of the valving element 61 to form a concave portion. The concave portion continues to the inside space of the small-diameter cylinder section 61a.

A bottomed cylindrical wax case 62 is fastened to the valving element 61 via a diaphragm 63 by caulking the aperture edge so as to cover the concave portion of the valving element 61. The wax case 62 contains a wax 64 as a thermal expansion material. A semifluid 65 is filled in the concave portion of the valving element 61 on the other side of the diaphragm 63.

A piston 68 is slidably inserted into the inside space of the small-diameter cylinder section 61a via a rubber piston 66 contacting the semifluid 65 and a backup plate 67.

A C-ring 69 is fit into a circumferentially opening slot near the aperture end 51a on the inner peripheral surface of the valve body 51. A spring 70 is inserted between the C-ring 69 and the valving element 61 to press the valving element 61 against the bottom wall 51b of the valve body 51.

Figure 14:
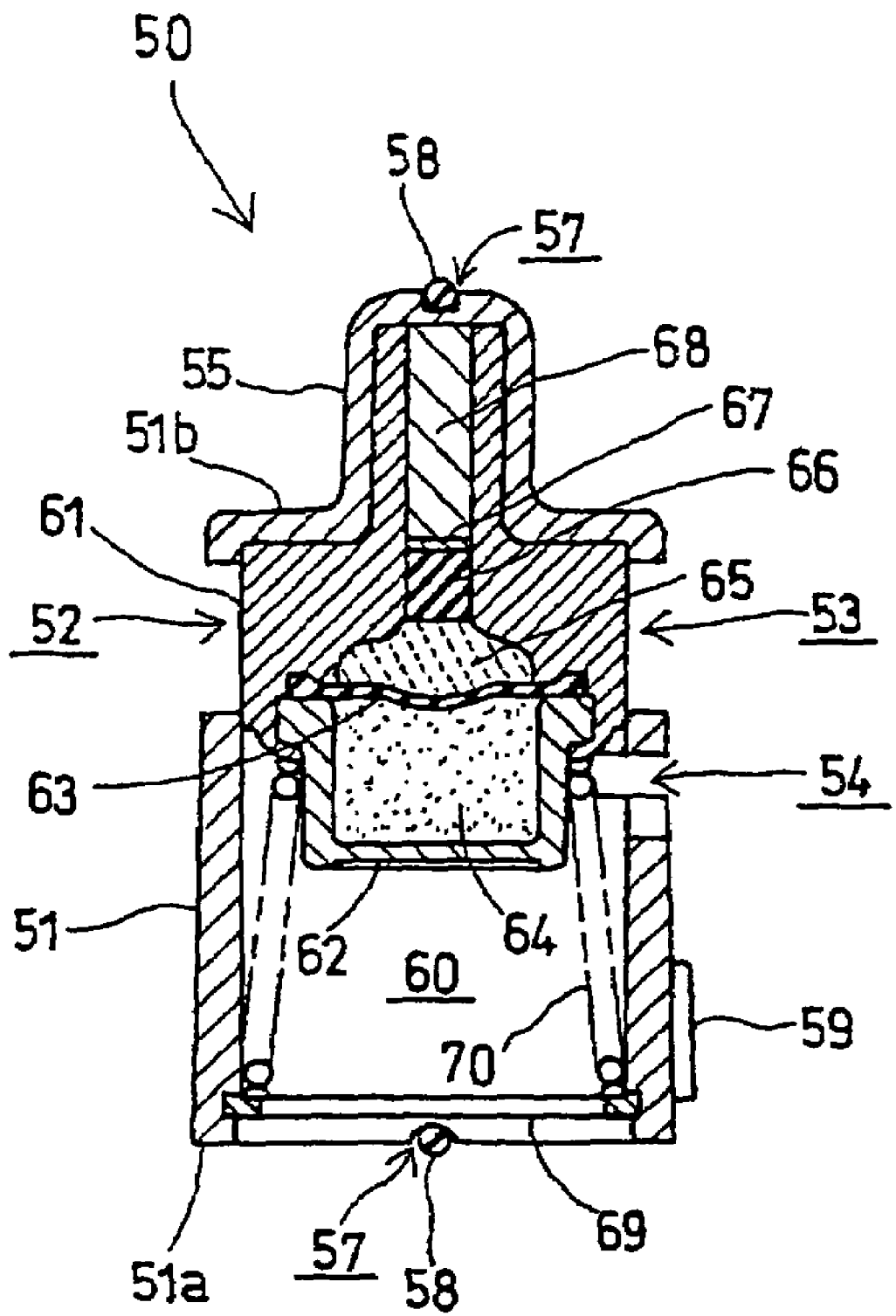
FIG. 14 is a sectional view taken along lines XIV—XIV of FIG. 11.
Figure 15:
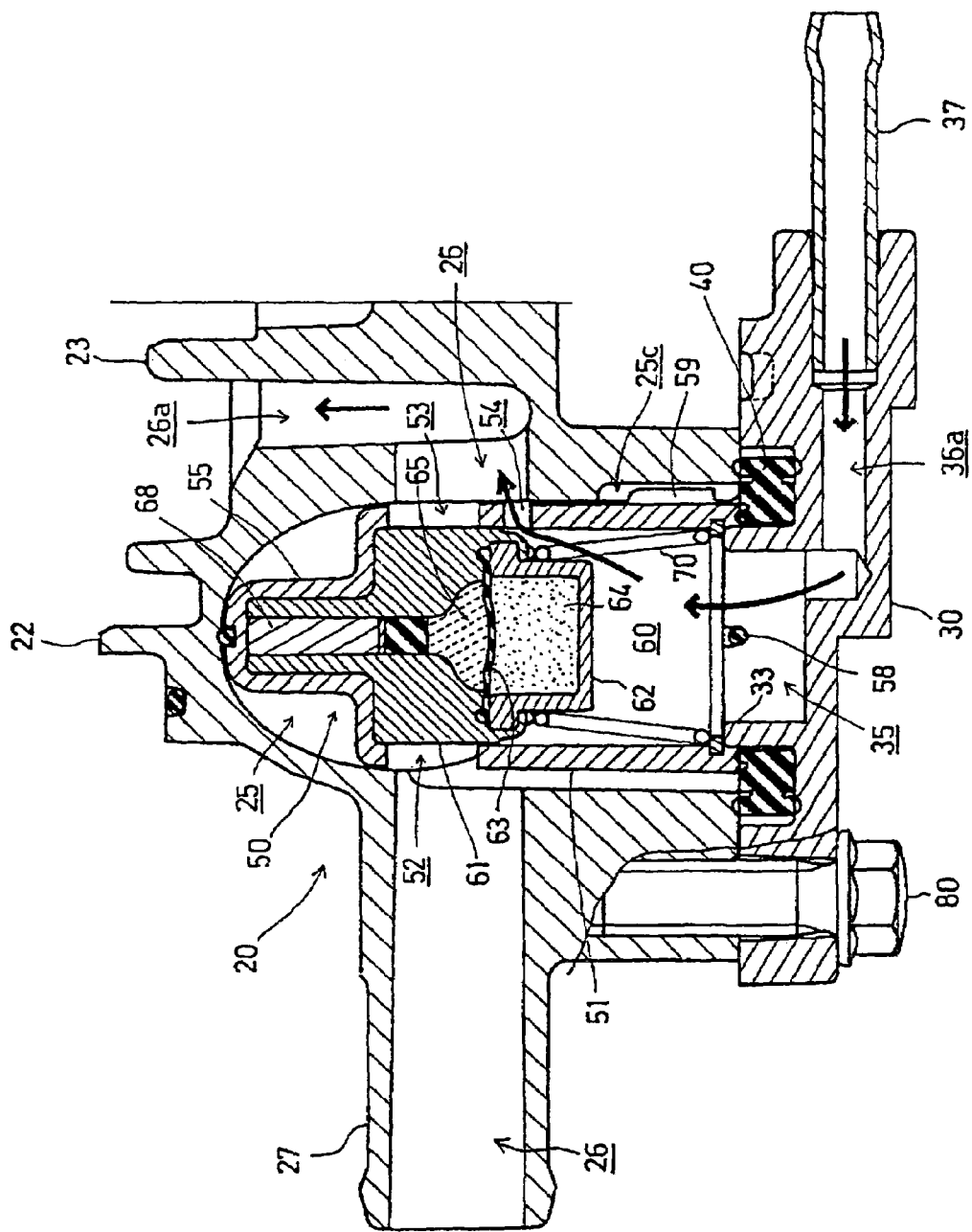
FIG. 15 is an enlarged sectional view showing the mounting structure when the thermostat is set to a low temperature.

At a low temperature, as shown in FIGS. 14 and 15, a force applied by the spring 70 allows the valving element 61 to touch the bottom wall 51b to close the entry aperture 52 and the exit aperture 53. At this time, the by-pass aperture 54 opens.

When the temperature rises, the wax 64 expands to swell the diaphragm 63 and push the rubber piston 66 via the semifluid 65. This pressing force is transmitted to the piston 68 via the backup plate 67 to push the piston 68 out of the small-diameter cylinder section 61a.

Figure 16:
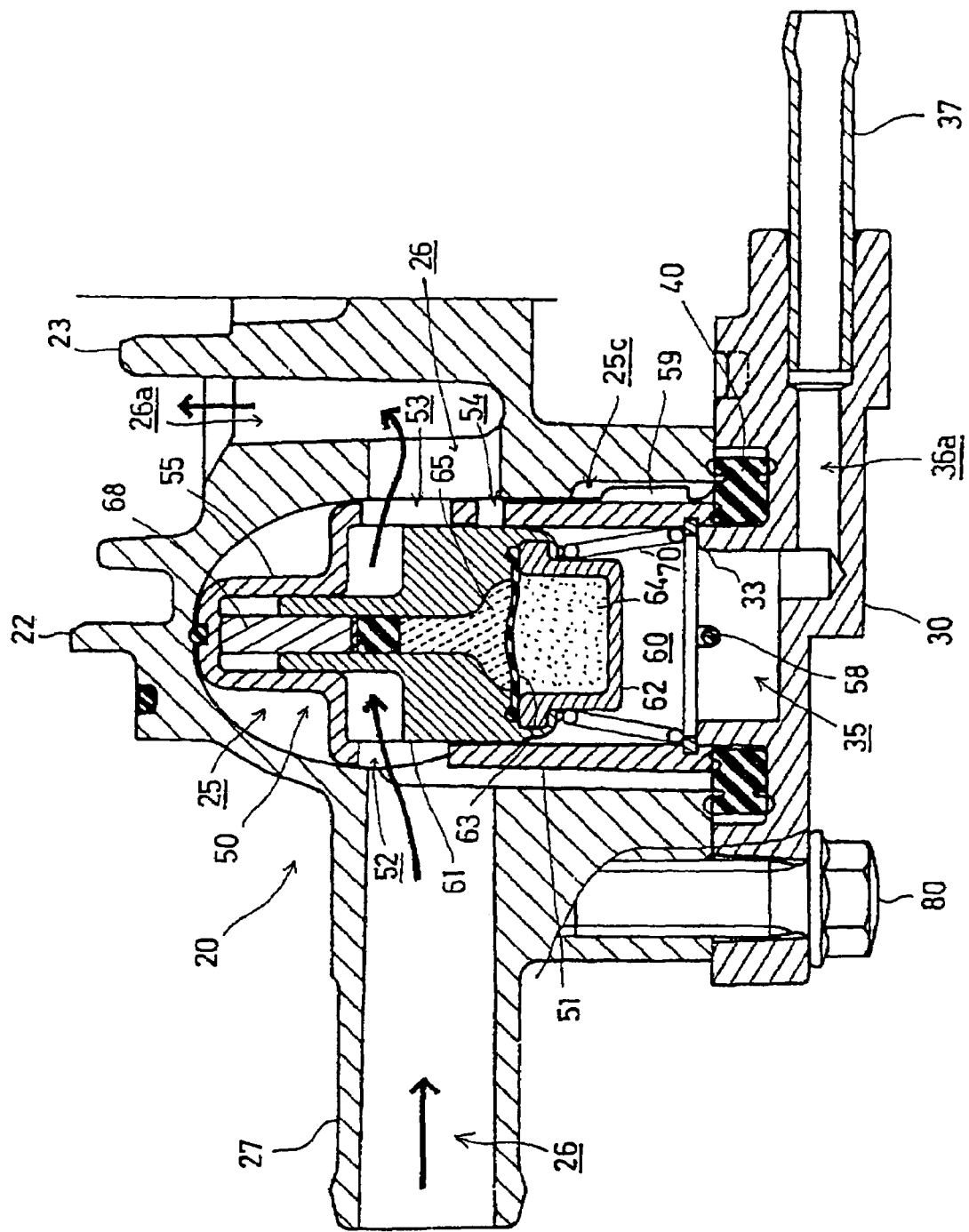
FIG. 16 is an enlarged sectional view showing the mounting structure when the thermostat is set to a high temperature.
Figure 17:
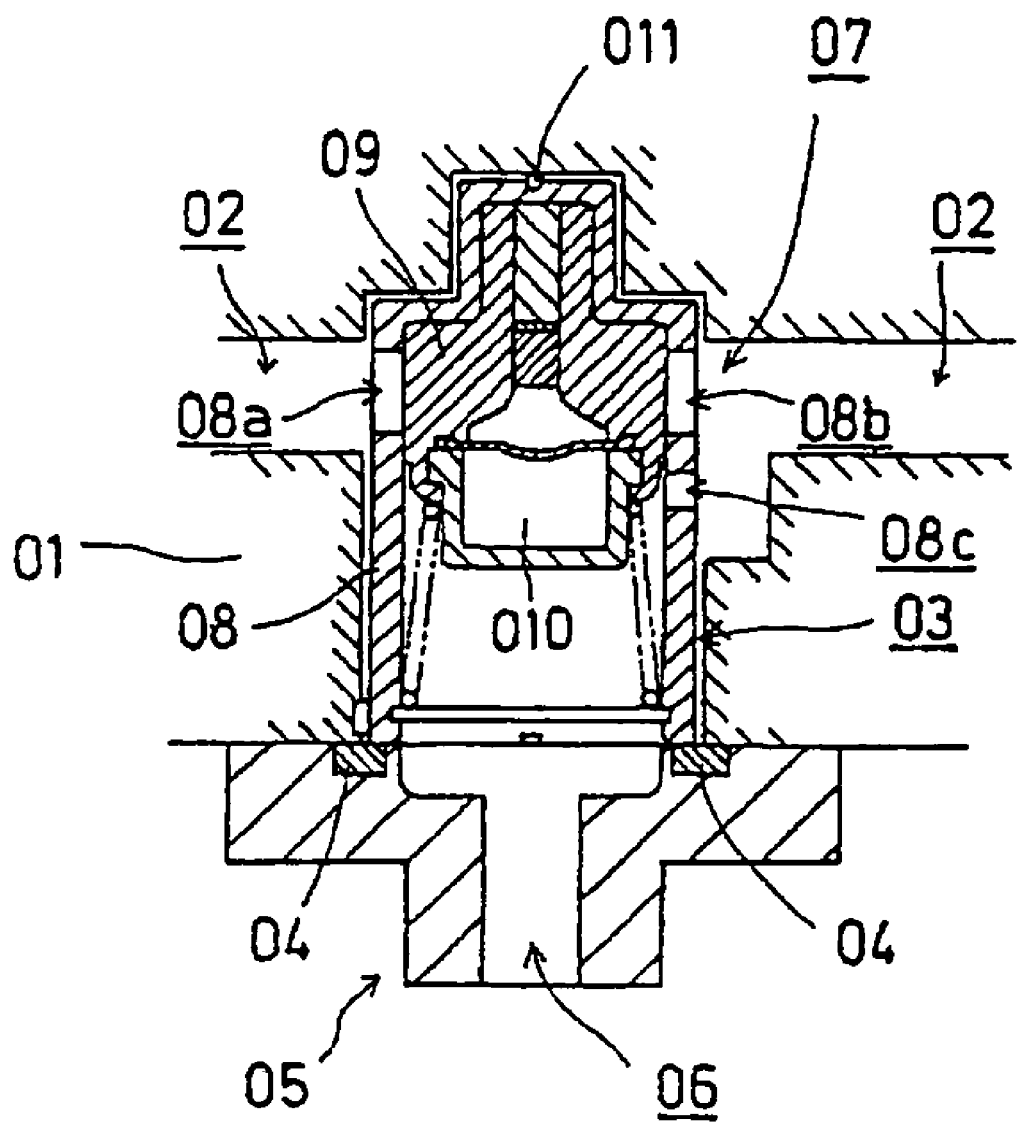
FIG. 17 is a sectional view showing a mounting structure of a conventional thermostat.

However, the piston 68 is stationed to a specified position always in contact with the bottom of the bottomed cylinder section 55. As a reaction, the valving element 61 moves against the spring 70 to open the entry aperture 52 and the exit aperture 53 as shown in FIG. 16 so that both apertures can communicate with each other.

At this time, the by-pass aperture 54 closes.

The above-mentioned thermostat 50 is inserted into the thermostat chamber 25 of the pump cover case 20.

At the same time, the piece 59 projecting outside the valve body 51 is inserted into the slot 25c on the inside periphery of the thermostat chamber 25. This enables positioning along the rotative direction around the center axis of the valve body 51. After the insertion, the entry aperture 52 and the exit aperture 53 face to the coolant suction channel 26.

At the same time, the by-pass aperture 54 faces to the coolant suction channel 26 like the exit aperture 53.

The O-ring 58 provided around the valve body 51 is pressed by the inner peripheral surface 25a and the hemispheric surface 25b of the thermostat chamber 25. Consequently, the O-ring 58 partitions a space between the inner peripheral surface 25a and the valve body 51 into the side of the entry aperture 52 and the side of the exit aperture 53 together with the ribs 56 of the thermostat 50.

The thermostat cover 30 covers the aperture of the thermostat chamber 25 inserted with the thermostat 50.

Figure 5:
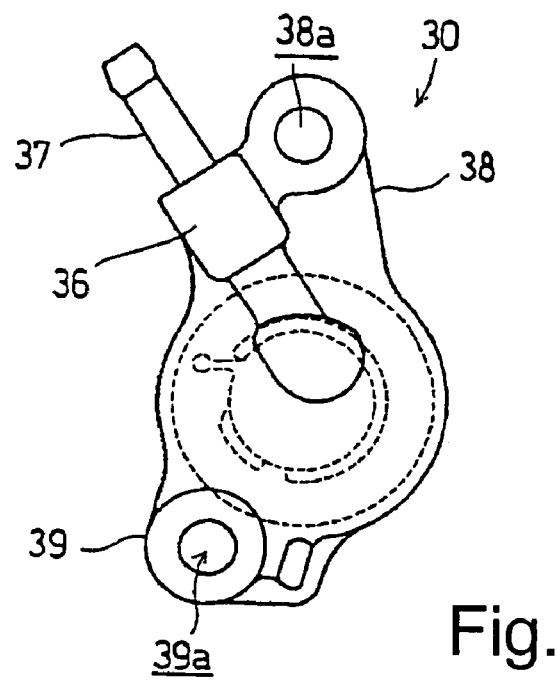
FIG. 5 is a side view of a thermostat cover.
Figure 6:
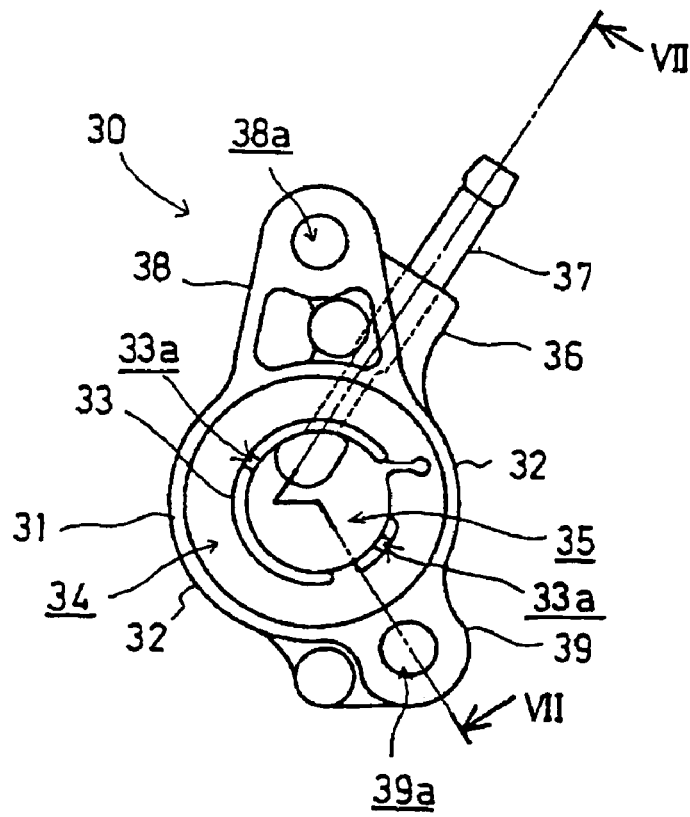
FIG. 6 shows a rear view of the thermostat cover.
Figure 7:
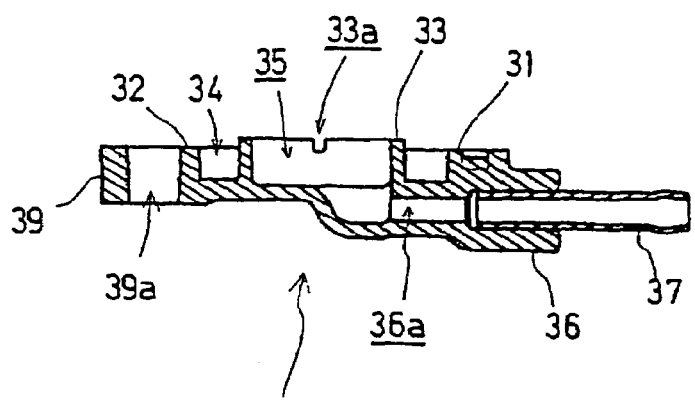
FIG. 7 is a sectional view taken along lines VII—VII of FIG. 6.

As shown in FIGS. 5 through 7, the thermostat cover 30 is provided with a coaxial circular outer wall 32 and a slightly higher inner circular rib 33 arranged vertically on a mating face 31 corresponding to the mating face 24 of the pump cover case 20. A circular groove 34 is formed between the outer wall 32 and the inner circular rib 33. A concave portion 35 is formed inside the inner circular rib 33.

A by-pass channel 36a connects to the concave portion 35 and comprises a by-pass pipe 36 that extends to one side. A connection pipe 37 is pressed into the by-pass pipe 36.

The mating face 31 includes an end face of the outer wall 32 and the end faces of the extended sections 38 and 39 that extend sideways. The extended sections 38 and 39 have mounting holes 38a and 39a.

The inner circular rib 33 is higher than the outer wall 32 and projects from the mating face 31. An outside diameter of the inner circular rib 33 equals an inside diameter of the aperture end 51a of the valve body 51 in the thermostat 50. The inner circular rib 33 can be inserted into the valve body 51 along the inner peripheral surface 51a.

A pair of notches 33a are formed opposite to each other at specified positions on an edge of the inner circular rib 33. The width between the notches corresponds to the diameter of the O-ring 58 provided around the valve body 51 in the thermostat 50.

The depth of the notches 33a is approximately equal to the projection of the mating face 31 from the inner circular rib 33. The bottom of each of the rounded notches 33a is almost level with the mating face 31 (see FIG. 7).

A circular rubber seal 40 is fit into the circular groove 34 between the inner circular rib 33 and the outer wall 32.

Figure 8:
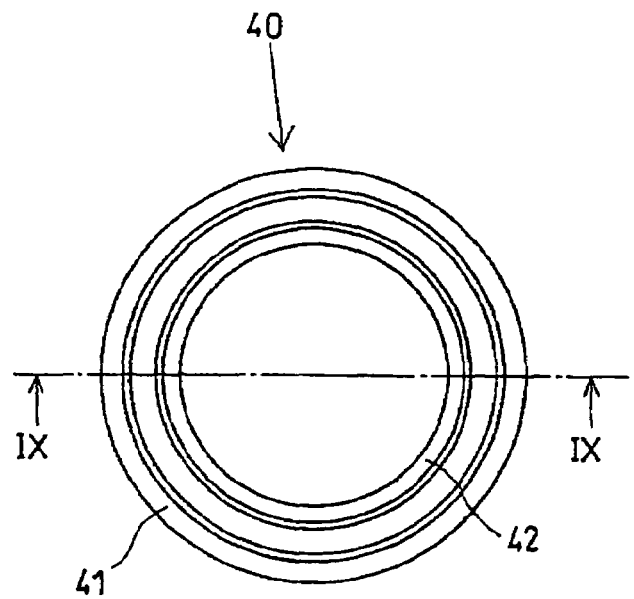
FIG. 8 is a plan view of a rubber seal.
Figure 9:
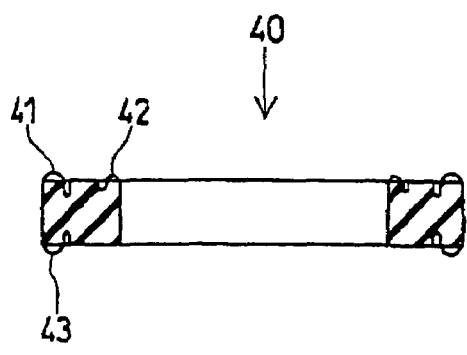
FIG. 9 is a sectional view taken along lines IX—IX of FIG. 8.
Figure 10:
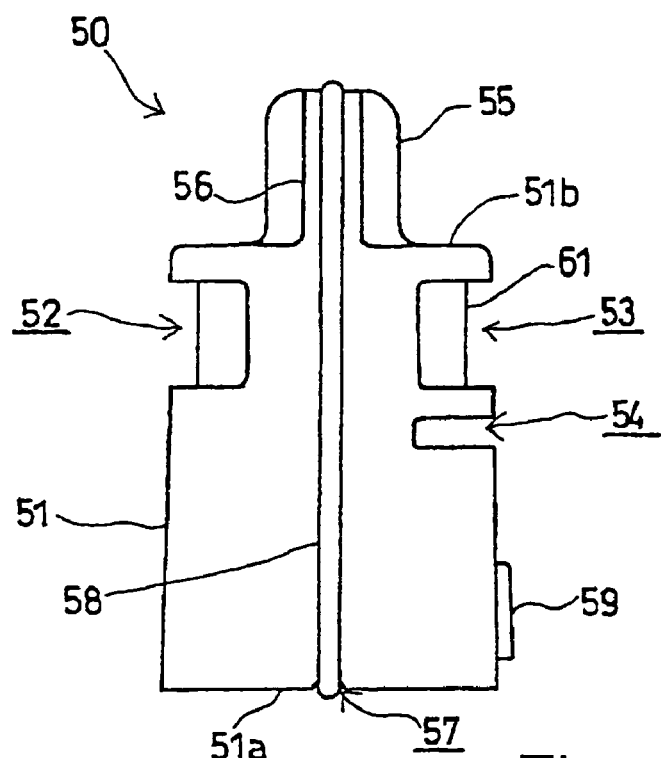
FIG. 10 is a front view of a thermostat.
Figure 11:
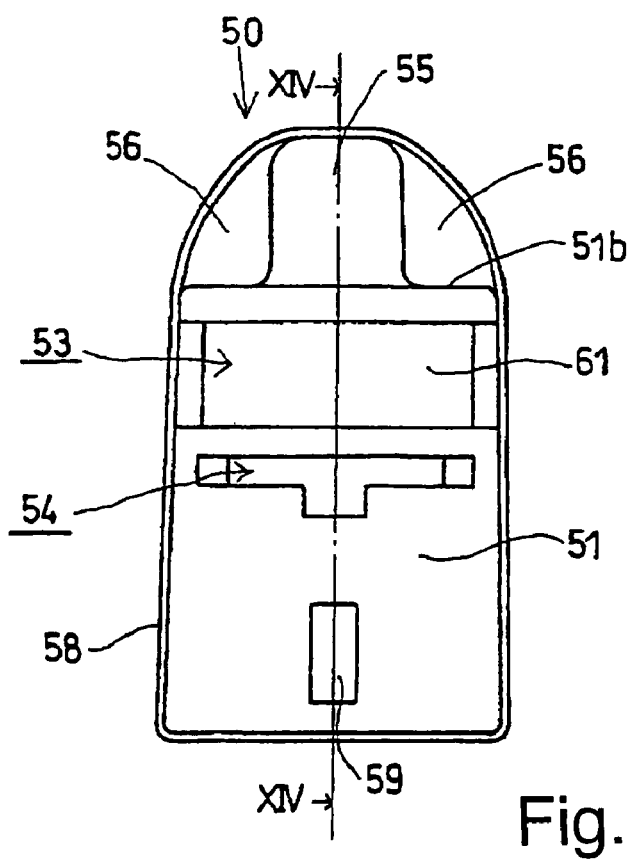
FIG. 11 is a side view of the thermostat.
Figure 12:
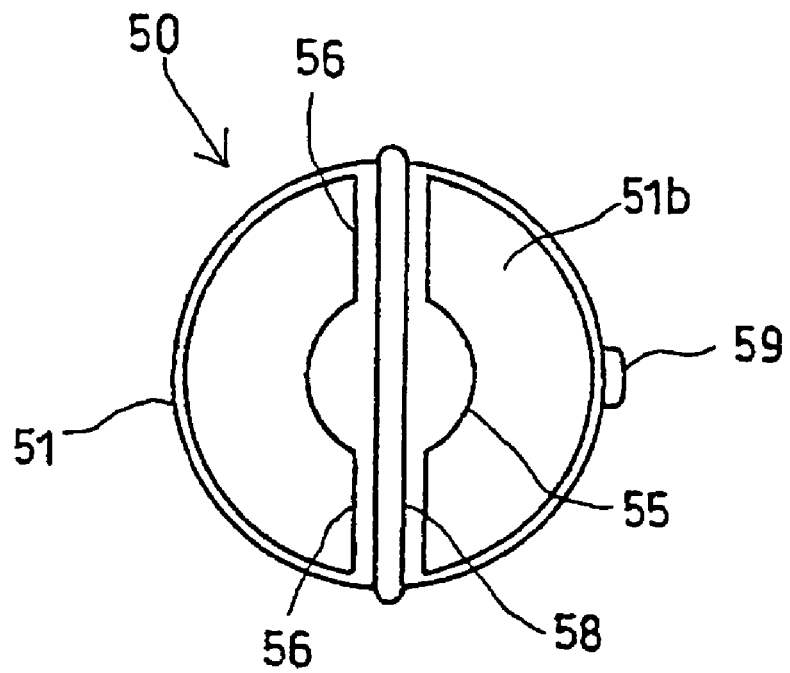
FIG. 12 is a top view of the thermostat.
Figure 13:
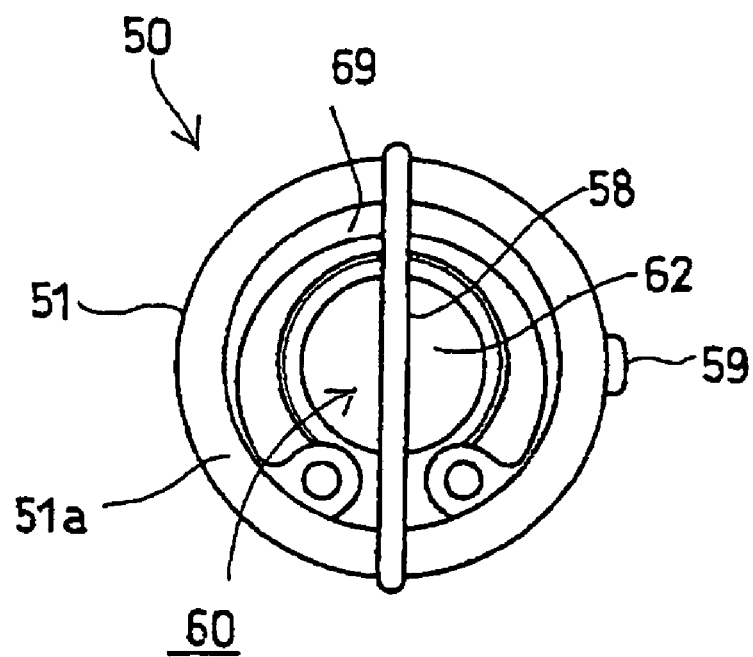
FIG. 13 is a bottom view of the thermostat.

FIGS. 8 and 9 illustrate the shape of the rubber seal 40.

The rubber seal 40 is circular and has a rectangular section. Projecting pieces 41 and 42 are formed along outer and inner peripheries on one side of the rubber seal 40. A projecting piece 43 is formed along an outer periphery on the other side thereof.

Small slots are formed along the projecting pieces 41, 42, and 43.

The rubber seal 40 is fit into the circular groove 34 of the thermostat cover 30. The thermostat cover 30 can be aligned so as to cover the thermostat chamber 25 of the pump cover case 20 inserted with the thermostat 50. In this case, the inner circular rib 33 projecting from the mating face 31 of the thermostat cover 30 is inserted into the thermostat 50 along the inner peripheral surface at the aperture end of the valve body 51. The thermostat 50 can be centered with a simple structure.

The O-ring 58 positioned around the valve body 51 crosses at the aperture end of the valve body 51 along the diametric direction. When the inner circular rib 33 is engaged with the aperture end of the valve body 51, the O-ring 58 is fit into the pair of notches 33a formed on the edge of the inner circular rib 33. The inner circular rib 33 can be attached without being obstructed by the O-ring 58.

The rubber seal 40 is pressed across the mating face 24 around the thermostat chamber 25 and the aperture end 51a of the valve body 51 in the thermostat 50. In this manner, the rubber seal 40 seals the inside space 60 of the valve body 51 from the outside space.

The inner circular rib 33 is inserted into the aperture end of the valve body 51 in the thermostat 50 to accurately and reliably center the thermostat 50. Accordingly, it is possible to reliably protect the valve body 51 against misalignment and improve the sealability.

The thermostat cover 30 is fit to the pump cover case 20. Two bolts 80 are inserted into the mounting holes 38a and 39a of the thermostat cover 30 and are screwed into screw holes 24a of the pump cover case 20. In this manner, the thermostat 30 is attached to the pump cover case 20 to house the thermostat 50.

As mentioned above, the O-ring 58 is provided around the valve body 51. The O-ring 58 is pressed against the inner peripheral surface 25a and the hemispheric surface 25b of the thermostat chamber 25. Further, the O-ring 58 is sandwiched between the aperture end 51a of the valve body 51 and the rubber seal 40. In this manner, the O-ring 58 completely partitions the inner peripheral surface 25a of the thermostat chamber 25, the valve body 51, and gaps into the side of the entry aperture 52 and the side of the exit aperture 53 for sealing.

The rubber seal 40 separates the inside space 60 of the valve body 21 from the outside space, i.e., a gap space between the thermostat 50 and the thermostat chamber 25 for sealing.

As shown in FIG. 1, the coolant supplied from the water pump 5 flows into the internal combustion engine E. The coolant from the internal combustion engine E flows into the radiator R. The coolant supplied from the radiator R passes through the coolant suction channel 26 of the pump cover case 20 and flows into the entry aperture 52 of the thermostat 50. On the other hand, the coolant from the internal combustion engine E passes through the by-pass channel 36a and flows into the inside space 60 of the thermostat 50.

Immediately after the internal combustion engine E starts, the low-temperature coolant before warm-up circulates through the cooling system. The low temperature is transmitted from the coolant to the wax 64 in the thermostat 50 via the valving element 61 and the wax case 62. In this case, as shown in FIGS. 1 and 15, the valving element 61 closes entry aperture 52 and the exit aperture 53 and opens the by-pass aperture 54.

After the coolant is supplied from the water pump 5 and circulates through the internal combustion engine E to be heated, the coolant flows through a by-pass circulation path from the by-pass channel 36a to the inside space 60 of the thermostat 50, through the by-pass aperture 54, then to the weather pump 5 as shown in FIGS. 1 and 15.

Since the coolant circulates through only the internal combustion engine E without passing through the radiator R, the internal combustion engine E can be warmed up fast.

With the lapse of time, the circulating coolant is heated. The wax 64 in the wax case 62 of the thermostat 50 thermally expands to increase its volume. Consequently, an expansive force is applied to push the piston 68 out of the small-diameter cylinder section 61a. As a reaction, the valving element 61 moves against the spring 70 to open the entry aperture 52 and the exit aperture 53 as shown in FIG. 16 to communicate with each other. At the same time, the by-pass aperture 54 closes.

During a normal operation, the coolant is supplied from the water pump 5, circulates through the internal combustion engine E to be heated, and flows into the radiator R. The coolant follows the circulation path so that it is cooled in the radiator R, passes through the communicating apertures, i.e., the entry aperture 52 and the exit aperture 53 of the thermostat 50, and then is absorbed in the water pump 5. In this manner, the internal combustion engine E is cooled.

During warm-up, there is formed the coolant circulation path where the coolant circulates only through the internal combustion engine E through the by-pass channel 36a. In this case, if the rubber seal 40 incompletely seals the thermostat 50, the coolant, cooled through the radiator R, leaks from the outside of the valve body 51 to the inside space 60 of the thermostat 50. The cooled coolant mixes with the coolant circulating through the internal combustion engine E, thus preventing the coolant temperature from rising and prolonging the warm-up time. According to the embodiment, the thermostat 50 has such a mounting structure that the inner circular rib 33 of the thermostat cover 30 is inserted along the inner peripheral surface at the aperture end of the valve body 51 for the thermostat 50. Consequently, the thermostat 50 is positioned accurately and reliably, thus ensuring high sealability. This structure almost completely prevents the coolant passing through the radiator R from leaking out to the circulation path through the internal combustion engine and can solve the problem relating to a prolonged warm-up time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A thermostat mounting structure comprising:
   a coolant channel formed in a casing;
   an embedding hole formed in the casing across the coolant channel;
   a thermostat including a cylindrical valve body with a surrounding wall including an entry aperture and an exit aperture;
   a valving element for advancing and retracting for selectively opening and closing the entry aperture and the exit aperture;
   said thermostat being inserted into the embedding hole so that both apertures face the coolant channel;
   a cover member for covering the embedding hole via a circular rubber seal seated in a groove of the cover member and for fixing the thermostat; and
   a positioning structure for positioning the thermostat to a side of the cover member,
   wherein the positioning structure positions the thermostat by engagedly supporting an aperture end of the cylindrical valve body,
   wherein the aperture end of the cylindrical valve body presses the circular rubber seal, and
   wherein the rubber seal is circular, has a rectangular section and includes projecting pieces formed along inner and outer peripheries of the rubber seal.

2. The thermostat mounting structure according to claim 1, wherein the positioning structure positions the thermostat by inserting a joint into an inside periphery of an aperture end of the cylindrical valve body.

3. The thermostat mounting structure according to claim 2, wherein the joint is a circular rib; and
   wherein the rib is inserted along an inner peripheral surface of an aperture end of the cylindrical valve body to position the thermostat.

4. The thermostat mounting structure according claim 3, wherein the positioning structure is formed on the cover member.

5. The thermostat mounting structure according claim 2, wherein the positioning structure is formed on the cover member.

6. The thermostat mounting structure according claim 1, wherein the positioning structure is formed on the cover member.

7. The thermostat mounting structure according claim 1, wherein the valve body includes a first end for mating with an interior surface of the embedding hole and a distal end for mating with said positioning structure for enabling said thermostat to be accurately positioned within said embedding hole.

8. The thermostat mounting structure according claim 7, and further including ribs extending from the first end of said valve body for forming a slot, an O-ring being positioned within said slot for dividing in two the outside periphery of the valve body.

9. A thermostat mounting structure comprising:
a coolant channel formed in a casing;
an embedding hole formed in the casing and extending across the coolant channel;
a thermostat including a valve body with a surrounding wall having an entry aperture and an exit aperture;
a valving element for advancing and retracting for selectively opening and closing the entry aperture and the exit aperture;
said thermostat being inserted into the embedding hole so that the entry aperture and the exit aperture face the coolant channel;
a cover member for covering the embedding hole and for fixing the thermostat to a side of the cover member for accurately positioning the thermostat within the embedding hole,
wherein the positioning structure positions the thermostat by engagedly supporting an aperture end of the cylindrical valve body,
wherein the aperture end of the cylindrical valve body presses the circular rubber seal, and
wherein the rubber seal is circular, has a rectangular section and includes projecting pieces formed along inner and outer peripheries of the rubber seal.

10. The thermostat mounting structure according to claim 9, wherein the positioning structure positions the thermostat by inserting a joint into an inside periphery of an aperture end of the cylindrical valve body.

11. The thermostat mounting structure according to claim 10,
wherein the joint is a circular rib; and
wherein the rib is inserted along an inner peripheral surface of an aperture end of the cylindrical valve body to position the thermostat.

12. The thermostat mounting structure according claim 11, wherein the positioning structure is formed on the cover member.

13. The thermostat mounting structure according claim 10, wherein the positioning structure is formed on the cover member.

14. The thermostat mounting structure according claim 9, wherein the positioning structure is formed on the cover member.

15. The thermostat mounting structure according claim 9, wherein the valve body includes a first end for mating with an interior surface of the embedding hole and a distal end for mating with said positioning structure for enabling said thermostat to be accurately positioned within said embedding hole.

16. The thermostat mounting structure according claim 15, and further including ribs extending from the first end of said valve body for forming a slot, an O-ring being positioned within said slot for dividing in two the outside periphery of the valve body.

* * * * *